United States Patent Office 3,203,446
Patented Aug. 31, 1965

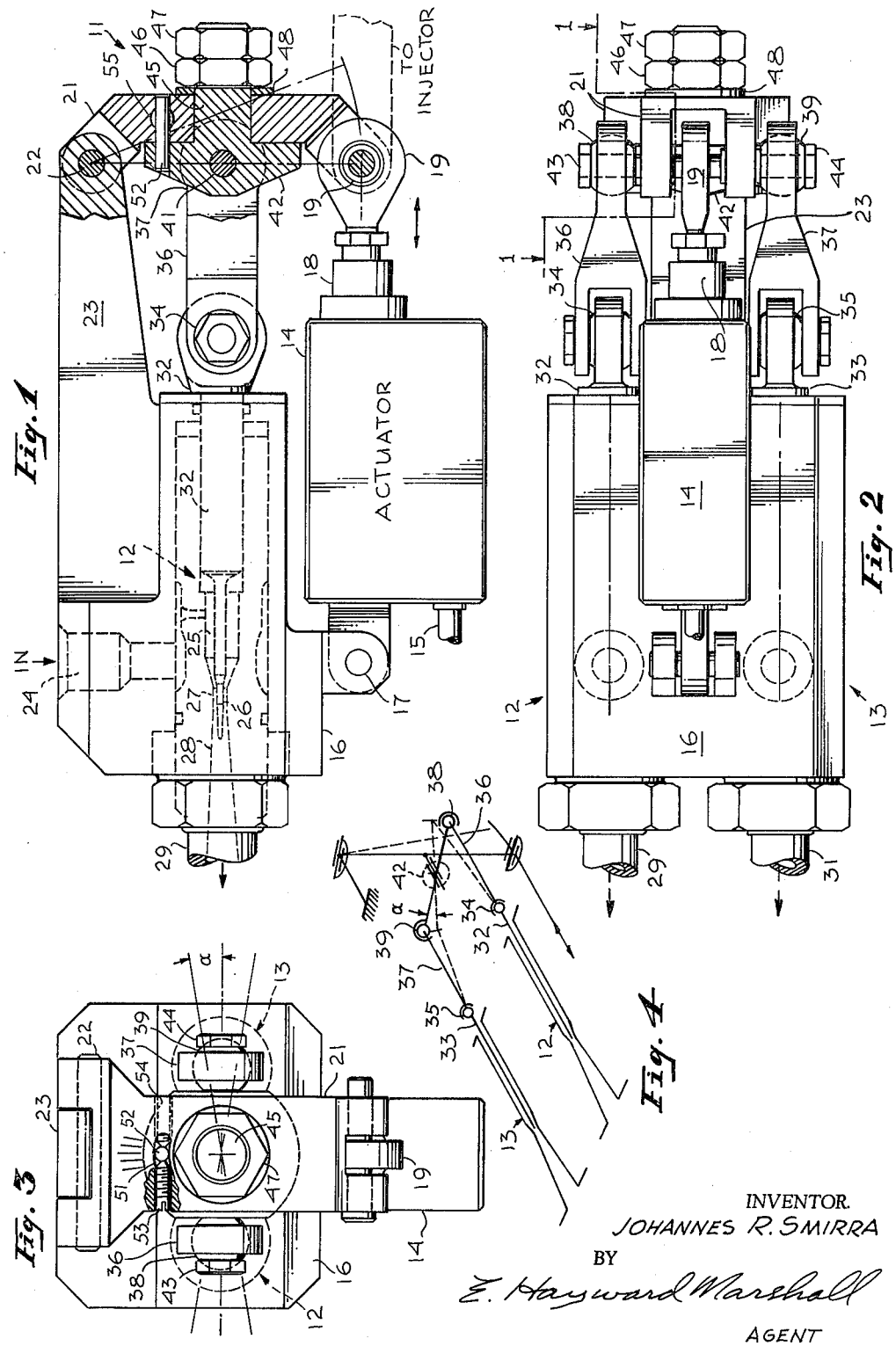

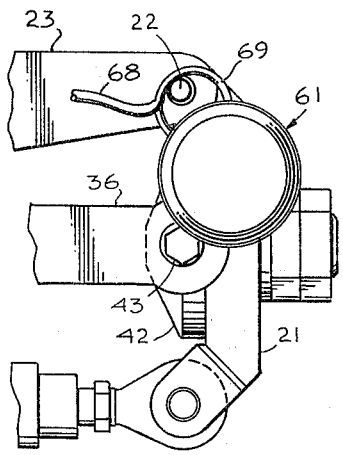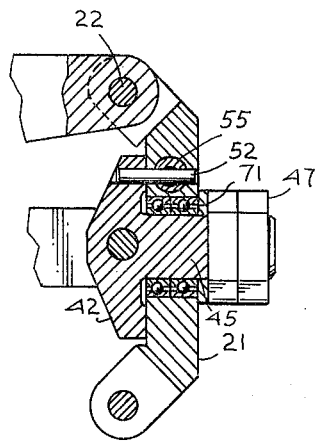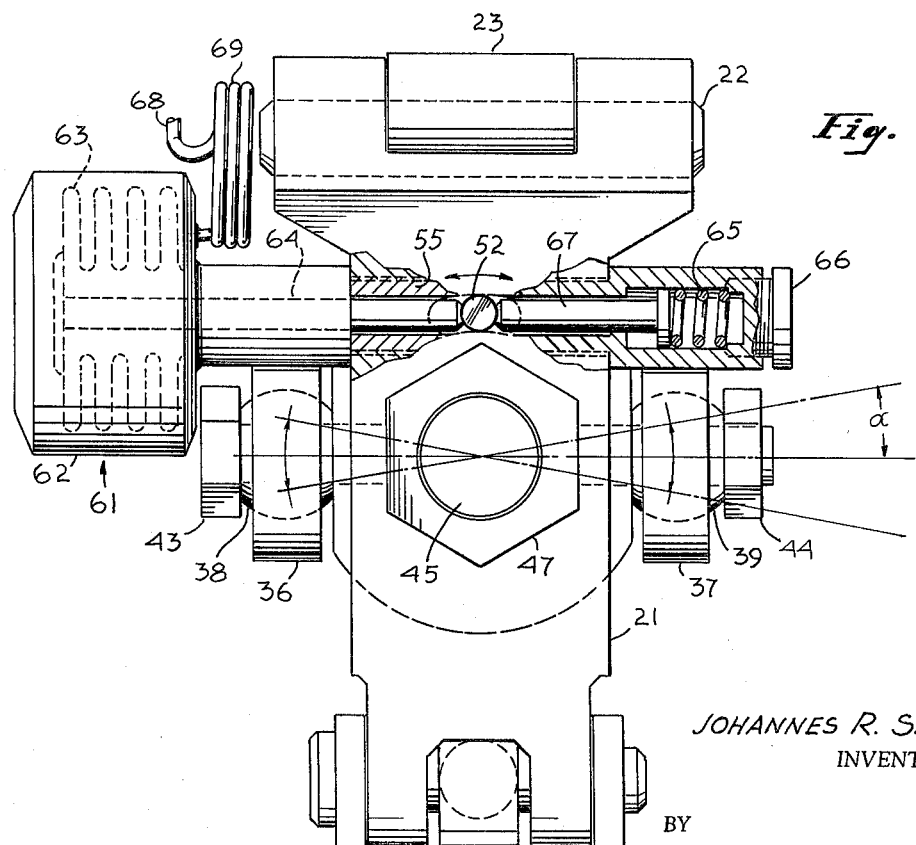

3,203,446
ACTUATOR FOR DIFFERENTIAL POSITIONING OF TWO FLOW CONTROL VALVES
Johannes R. Smirra, Los Angeles, Calif., assignor, by mesne assignments, to Thompson Ramo Wooldridge Inc., Cleveland, Ohio, a corporation of Ohio
Filed Feb. 11, 1963, Ser. No. 257,515
10 Claims. (Cl. 137—595)

This invention relates to an actuator for differential positioning of two flow control valves and more particularly to an actuator mechanism adapted to be connected to a pair of cavitating venturi valves with pintles movable axially within the throat of the venturi. The actuator mechanism is adapted to transmit equal or proportional control movements to the pintles in both valves.

While many diverse arrangements have been utilized for simultaneously operating a plurality of fluid valves, many of these devices have been complex, heavy and expensive to build. Others required a large amount of power to operate, and most of these devices were not adjustable to vary the proportion or mixture ratio of the two different fluids at all flow rates between zero and a maximum. Many of these prior devices were not designed for operation with valves, such as a cavitating venturi flow control valve, having a longitudinally movable pintle for controlling the flow area.

The present invention provides a simple and lightweight actuator mechanism for simultaneously controlling the flow rates and the mixture ratios of two cavitating venturi flow control valves, and is particularly useful in conjunction with the Variable Thrust Bipropellant Rocket Engine disclosed and claimed in the copending application of Gerard W. Elverum, Jr., Serial No. 260,610, filed February 25, 1963.

Briefly stated, one preferred embodiment of the actuator for differential positioning of two flow control valves of the present invention consists essentially of a lever arm, pivotally mounted on a suitable bracket or other support at one end, and pivotally connected at its opposite end to a push rod extending from a suitable actuator. A ratio control disc is swiveled or rotatably mounted on the lever arm intermediate its ends and is provided with an eccentric pin which extends into an arcuate slot in the lever arm for limiting the rotational movement of the control disc. A transverse bore intersects the arcuate slot at right angles to the axis of the pin, and suitable means, such as set screws threaded into the bore for manual adjustment or a bellows actuated push rod extending into the bore and opposed by a spring on the opposite side of the pin for automatic adjustment, is provided for varying the angular position of the control disc on the lever arm. A pin extending transversely through the control disc preferably has its opposite ends connected by a universal joint to a pair of push rods, which are in turn connected to the two pintles extending into the throats of a pair of cavitating venturi valves arranged side by side.

With the ratio control disc in its central position the displacement or longitudinal movement of both push rods and both pintles will be equal, since the respective lever arms about the pivot is the same. When the control disc is rotated in either direction the length of one of the lever arms will be increased and the length of the other lever arm will be decreased, so that the displacement of one push rod and its pintle will be increased, while the displacement of the other push rod and its pintle is decreased. This results in an increased flow through one valve and decreased flow through the other valve at all positions of the actuator and lever. If the pintles are properly shaped with respect to the throats of the venturi valves, adjustment of the control disc at any fixed position will result in a constant mixture ratio at all flow rates.

One object of the present invention is to provide an actuator mechanism for inter-connecting a pair of fluid flow control valves and transmitting equal or proportional control movements to both valves.

Another object of the present invention is to provide a simple and light-weight mechanism for maintaining an accurate control of the flow rates and the flow ratios of two flow control valves.

A still further object of the present invention is to provide means for varying the ratio of fluid flow through two cavitating venturi flow control valves and maintaining the desired flow ratio over a wide range of flow rates, and automatically adjusting the mixture ratio in response to certain changing parameters or deviations in the mixture ratio caused by changes in temperature, fluid density, pressure or cavitating venturi characteristics, as well as other requirements.

Still another object of the present invention is to provide means for varying the mixture ratio of two flow control valves, which can be either a fixed setting or variable during the normal operation of the valves, and which can be done manually or automatically in response to environmental conditions or other criterion.

A still further object of the present invention is to provide improved means for accurate flow and mixture ratio control of propellants to a rocket engine, wherein the mixture ratio may be adjusted to compensate for temperature, density and other variations in propellant utilization, either manually or automatically.

Other objects and many attendant advantages of this invention will be readily appreciated as the same becomes better understood by reference to the following detailed description when considered in connection with the accompanying drawing wherein:

FIG. 1 is a side view illustrating the cavitating venturi control valve and actuator assembly with the ratio control adjustment shown in section;

FIG. 2 is a bottom view of the control valve and actuator assembly of FIG. 1;

FIG. 3 is an end view of the control valve and actuator assembly of FIGS. 1 and 2 particularly illustrating the ratio control disc with a manual adjustment;

FIG. 4 is a schematic view illustrating the manner in which the mixture ratio is varied;

FIG. 5 is a partial side view illustrating one modification of the present invention with a bellows type of automatic adjustment for use with the mixture ratio control of FIGS. 1–3;

FIG. 6 is a partial sectional view showing the control disc mounting for the automatic adjustment mechanism of FIG. 5; and FIG. 7 is an end view of the automatic adjustment mechanism of FIGS. 5 and 6 with portions broken away.

Referring now to the drawings in detail and more particularly to FIGS. 1, 2 and 3, one preferred embodiment of the flow control and flow ratio adjusting mechanism of the present invention is illustrated, wherein the actuator mechanism 11 is utilized in conjunction with a pair of cavitating venturi flow control valves 12 and 13. However, the actuator mechanism of the present invention can obviously be used with many other types of flow control valves, particularly those in which the flow control elements has a linear movement for varying the throat area of the valve in a linear manner.

An actuator 14, which may be hydraulically or electrically operated by remote control through a line or conduit 15, is pivotally connected at one end to the housing 16 of the valve assembly by a pivot pin 17. The actuator 14 moves the push rod 18 in an axial direction in accordance with the control signal through the line 15.

Push rod 18 is connected by a pivot pin 19 to a clevis 20 at the lower end of the lever arm 21 which is pivotally mounted at its upper end on a pin 22 extending through the end of the support arm 23 which extends outwardly from the valve housing 16. When used with the rocket engine mentioned supra, the pivot pin 19 may also be connected through a suitable linkage to the control mechanism of a variable area injector (not shown).

The housing 16 for the valve assembly encloses the two cavitating venturi flow control valves 12 and 13, each of which includes an inlet opening, such as the one shown at 24 in dotted lines in FIG. 1, extending into the converging intake section 25. The contoured pintle 26 extends into the throat section 27 to control the throat area and vary the flow through the throat area 27 in a linear manner. In this type of cavitating venturi flow control valve the pintles are preferably parabolic in contour, so that the change in area of the throat is directly proportional to the linear axial movement of the pintle. The diverging outlet section 28 is connected to the outlet line 29 and the other cavitating venturi flow control valve 13, which is similar in construction, has an inlet opening 30 and extends into the outlet line 31.

The contoured pintle 26 in venturi valve 12 may be integrally formed or rigidly connected at its outer end to the push rod 32, and the corresponding contoured pintle (not shown) in venturi valve 13 is similarly connected to the push rod 33. The push rods 32 and 33 are connected by means of the ball and socket universal joints 34 and 35 to the links 36 and 37, which in turn are connected through the ball and socket universal joints 38 and 39 to the threaded ends of a yoke beam or pin 41 extending transversely through the ratio control disc 42. The pin 41 has both ends threaded to receive the nuts 43 and 44 which retain the ball and socket universal joints 38 and 39 in position.

The ratio control disc 42, lever arm 21, and a portion of the support arm 23 is broken away and shown in section in FIG. 1 to illustrate the manner in which the control disc 42 is rotatably mounted on the stub shaft 45 extending through the lever arm 21 which forms a bearing therefor. The outer end of the stub shaft 45 is threaded to receive the nut 46 and lock nut 47, as well as the washer 48.

An arcuate slot 51, as shown in FIG. 3, receives a pin 52 extending from the control disc 42. The pin 52 may be positioned in the arcuate slot 51 by means of a pair of opposed set screws 53 and 54 in a threaded bore 55 intersecting the slot 51 at right angles to the pin 52.

By adjusting the set screws 53 and 54, the pin 52 may be moved from one end of the arcuate slot 51 to the other, thus rotating the control disc 42 through the angle α in either direction for varying the flow ratio of the two cavitating venturi flow control valves 12 and 13. If desired, the ratio control disc 62 may then be secured in any adjusted position by tightening the nuts 46 and the lock nut 47.

It will be quite apparent after careful consideration of the schematic view of FIG. 4, that by rotation of the control disc 42 in a counter-clockwise direction, as seen in FIG. 4, or in a clockwise direction, as seen in FIG. 3, the length of the lever arm about the pivot pin 22 will be increased for the link 37 and decreased for the link 36, as the lever arm 21 is moved by the actuator 14 and push rod 18 through the universal joint 19. In this position, after rotation through the angle α, it will be apparent that the linear movement of push rod 33 and its pintle will be proportionately larger than the corresponding movement of push rod 32 and pintle 26. This will increase the ratio of flow of fluid through control valve 13 with respect to control valve 12. Alternatively, movement of the ratio control disc 42 in a clockwise direction, as shown in FIG. 4, or in a counter-clockwise direction, as shown in FIG. 3, will increase the ratio of fluid flow through control valve 12 with respect to control valve 13.

Obviously, the set screws 53 and 54 may be replaced by any other suitable actuating mechanism for automatically or manually adjusting the mixture ratio or flow ratio of the two control valves 12 and 13 in accordance with any desired control function, such as the temperature or utilization of propellants in the bipropellant rocket engine mentioned above, which is only one of many specific applications and uses of the present invention.

One such actuating device for automatically adjusting the mixture ratio is shown in FIGS. 5–7, illustrating one modification of the present invention with a bellows type of automatic adjustment for the mixture ratio control.

Since the control valve assembly including the venturi valves 12 and 13 and the actuator mechanism 11 are identical in FIGS. 5–7, the same numerals will be used throughout for the parts shown corresponding to the parts in FIGS. 1–4.

In this embodiment of the invention a conventional bellows actuator 61 is mounted on the side of the lever 21 and consists of a housing 62 enclosing an expansible metal bellows 63 having a shaft 64 extending through the housing 62 and into the transverse bore 55 to engage the pin 52 extending from the control disc 42. A spring 65 is mounted in a housing 66 and a plunger 67 extending into the transverse bore 55 resiliently urges the pin 52 toward the inner end of shaft 64.

The expansible fluid from any desired control source (not shown) is supplied under pressure through the tubing 68, which may be formed into a helical coil 69 about the axis of pivot pin 22 before it is connected to bellows 61. Control disc 42 is preferably mounted with a ball bearing 71 on stub shaft 45.

Many other types of hydraulic, pneumatic, thermostatic or electrical control systems may be utilized in place of the bellows shown in FIGS. 5–7.

Obviously, many other modifications and variations of the present invention may be made within the scope of the following claims.

What is claimed is:

1. An actuator for differential positioning of two flow control valves comprising:
   (A) a lever arm pivotally mounted about an axis;
   (B) a ratio control element rotatably mounted on said lever arm;
   (C) first pivotal means for connecting one valve to one side of said control element and second pivotal means connecting the other valve to the opposite side of said control element; and
   (D) means coupled to said lever arm for adjusting the angular position of said control element for varying the flow ratio of said valves, said first and second pivotal means each including a rigid arm member pivotally interconnected between the valve and control element, whereby the angular positioning of said control element oppositely varies the effective moment arm distance between the lever arm and the pair of valves.

2. In the actuator of claim 1, said ratio control element comprising a disc rotatably mounted on said lever arm.

3. An actuator for differential positioning of two flow control valves comprising:
   (A) a lever arm pivotally mounted about an axis;
   (B) a ratio control disc rotatably mounted on said lever arm;
   (C) pivotal means for connecting one valve to one side of said disc and connecting the other valve to the opposite side of said disc; and
   (D) means coupled to said lever arm for automatically adjusting the angular position of said disc for varying the flow ratio of said valves, whereby the angular displacement of the disc on the lever arm in one direction increases the effective length of the moment arm connecting the lever with one valve and proportionately decreases the effective length of the moment arm connecting the lever with the other valve and the angular displacement of the disc in the opposite direction reversibly increases and decreases the effective lengths of the moment arms.

4. An actuator for differential positioning of two flow control valves comprising:
(A) a lever arm pivotally mounted about an axis at one end thereof;
(B) an actuator connected to said lever arm at the opposite end thereof and adapted to vary the angular position of said lever arm about said axis;
(C) a pair of links each having means for being pivotally connected to a corresponding pintle in a different one of said valves; and
(D) a ratio control disc having a stub shaft extending through said lever arm for rotatably mounting said disc,
said links each being pivotally connected to an opposite side of said disc,
an arcuate slot in said lever arm,
a pin on said disc extending into said slot,
a bore intersecting said slot at right angles to said pin, and manually adjustable means extending into said bore for positioning said pin and rotating said disc to vary the relative strokes of said pintles in accordance with the angular position of said disc.

5. An actuator for differential positioning of two flow control valves comprising:
(A) a lever arm pivotally mounted about an axis at one end thereof;
(B) an actuator connected to said lever arm at the opposite end thereof and adapted to vary the angular position of said lever arm about said axis;
(C) a pair of links each connected to a corresponding pintle in a different one of said valves; and
(D) a ratio control disc having a stub shaft extending through said lever arm for rotatably mounting said disc,
one of said links being connected to each of the opposite sides of said disc,
an arcuate slot in said lever arm,
a pin on said disc extending into said slot,
a bore intersecting said slot at right angles to said pin, and automatically adjustable means extending into said bore for positioning said pin and rotating said disc to vary the relative strokes of said pintles in accordance with the angular position of said disc.

6. A fluid flow ratio control mechanism comprising:
(A) a pair of cavitating venturi fluid flow control valves,
each of said valves having a throat and an inlet and an outlet section,
a pintle mounted for axial movement in each of said control valves and extending into said throat for varying the flow area thereof;
(B) means for simultaneously actuating both of said pintles to provide any desired ratio of fluid flow rates,
said means including a lever arm pivotally mounted about an axis transverse with respect to the axial movement of said pintles; and
(C) a ratio control disc having a stub shaft extending through said lever arm for rotatably mounting said disc,
said pintles being pivotally connected to the opposite sides of said disc,
an arcuate slot in said lever arm,
a pin on said disc extending into said slot,
a bore intersecting said slot at right angles to said pin, and manually adjustable means extending into said bore for positioning said pin and rotating said disc to vary the relative strokes of said pintles in accordance with the angular position of said disc.

7. A fluid flow ratio control mechanism comprising:
(A) a pair of cavitating venturi fluid flow control valves,
each of said valves having a throat and an inlet and an outlet section,
a pintle mounted for axial movement in each of said control valves and extending into said throat for varying the flow area thereof;
(B) means for simultaneously actuating both of said pintles to provide any desired ratio of fluid flow rates,
said means including a lever arm pivotally mounted about an axis transverse with respect to the axial movement of said pintles; and
(C) a ratio control disc having a stub shaft extending through said lever arm for rotatably mounting said disc on said lever arm,
said pintles being pivotally connected to the opposite sides of said disc,
an arcuate slot in said lever arm,
a pin on said disc extending into said slot,
a bore intersecting said slot at right angles to said pin, and automatically adjustable means extending into said bore for positioning said pin and rotating said disc to vary the relative strokes of said pintles in accordance with the angular position of said disc.

8. An actuator for differential positioning of two flow control valves comprising:
(A) a lever arm pivotally mounted about an axis at one end thereof;
(B) an actuator connected to said lever arm at the opposite end thereof and adapted to vary the angular position of said lever arm about said axis;
(C) a pair of links each adapted to be connected to a corresponding pintle in one of said valves; and
(D) a control disc having a stub shaft extending through said lever arm in a plane substantially perpendicular to said axis but spaced therefrom for rotatably mounting said disc,
one of said links being connected to each of the opposite sides of said disc on a line substantially parallel to said axis in one position,
an arcuate slot in said lever arm,
a pin on said disc substantially parallel to said shaft extending into said slot,
a bore in the arm intersecting said slot at an angle to said pin, and manually adjustable means extending into said bore and engaging said pin for positioning said pin and rotating said disc to vary the relative strokes of said pintles in accordance with the angular position of said disc.

9. An actuator for differential positioning of two flow control valves comprising:
(A) a lever arm pivotally mounted about an axis at one end thereof;
(B) an actuator connected to said lever arm at the opposite end thereof and adapted to vary the angular position of said lever arm about said axis;
(C) a pair of links each adapted to be connected to a corresponding pintle in one of said valves; and
(D) a control disc having a stub shaft extending through said lever arm in a plane substantially perpendicular to said axis but spaced therefrom for rotatably mounting said disc,
one of said links being connected to each of the opposite sides of said disc on a line substantially parallel to said axis in one position,
an arcuate slot in said lever arm,
a pin on said disc substantially parallel to said shaft extending into said slot,
a bore in the arm intersecting said slot at an angle to said pin, and automatically adjustable means extending into said bore and engaging said pin for positioning said pin and rotating said disc to vary the relative strokes of said pintles in accordance with the angular position of said disc.

10. A linkage mechanism for jointly and differentially positioning two axially movable shafts in given proportion comprising:

a lever arm pivotally movable about a first axis transverse to the shafts, a member rotatably supported on the lever arm about a second axis substantially parallel to the shafts, a first connecting linkage including a rigid element pivotally interconnecting one shaft to said member at a position displaced from said second pivot axis, a second connecting linkage including a rigid element pivotally interconnecting the other shaft to said member at a position oppositely displaced from said second pivot axis, means coupled to said lever arm for rotatively displacing said member on said lever arm to oppositely vary the effective moment between the lever arm and said two shafts, and means coupled to said lever arm for locking said member in the desired rotative position on said lever arm.

References Cited by the Examiner
UNITED STATES PATENTS

| | | | |
|---|---|---|---|
| 1,188,609 | 6/16 | Beer et al. | 251—234 X |
| 2,500,304 | 3/50 | Williams | 137—609 X |
| 2,736,212 | 2/56 | Spence | 74—522 |
| 2,975,804 | 3/61 | Dunn et al. | 137—607 X |

M. CARY NELSON, *Primary Examiner.*

MARTIN P. SCHWADRON, *Examiner.*